UNITED STATES PATENT OFFICE.

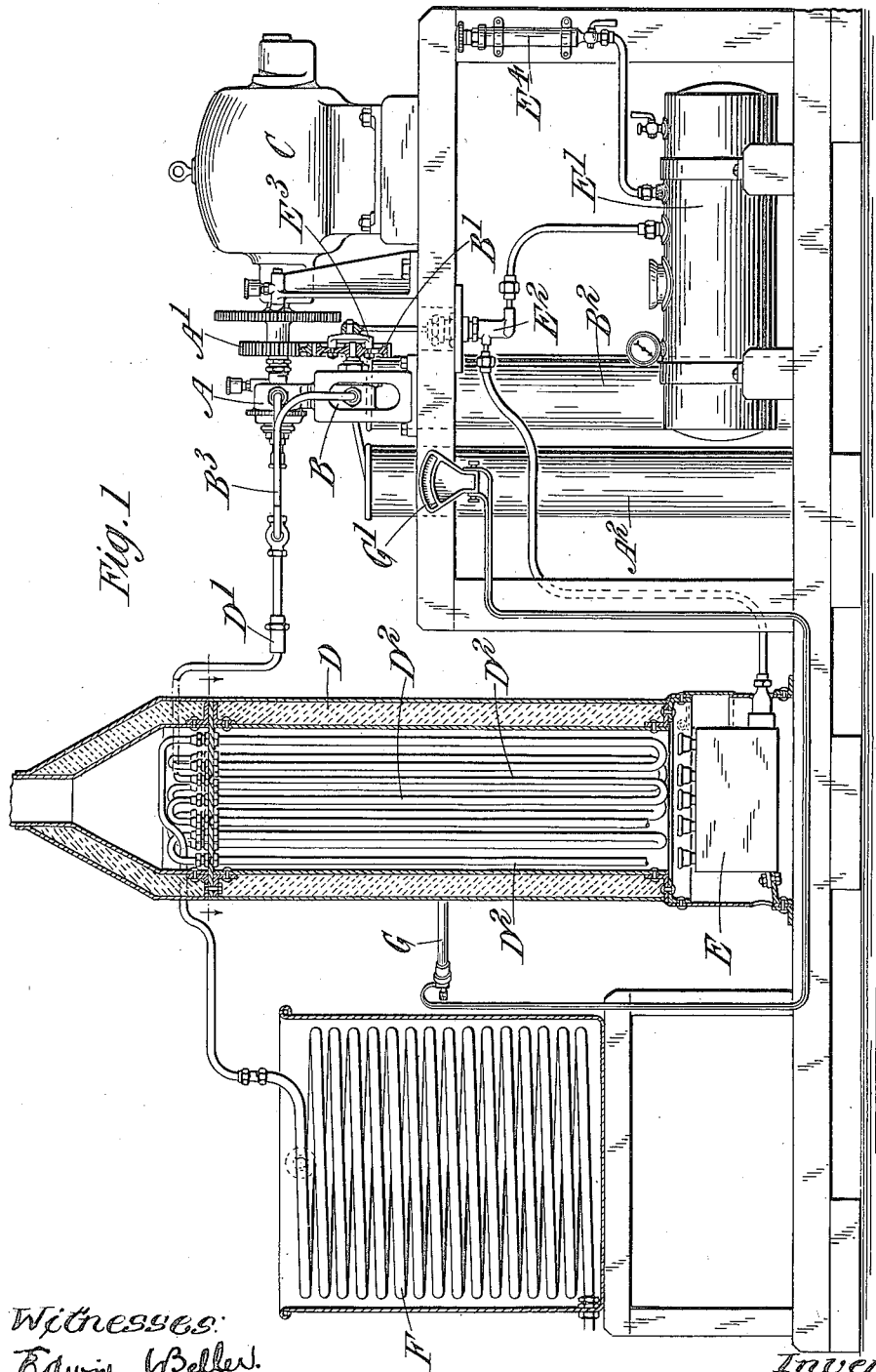

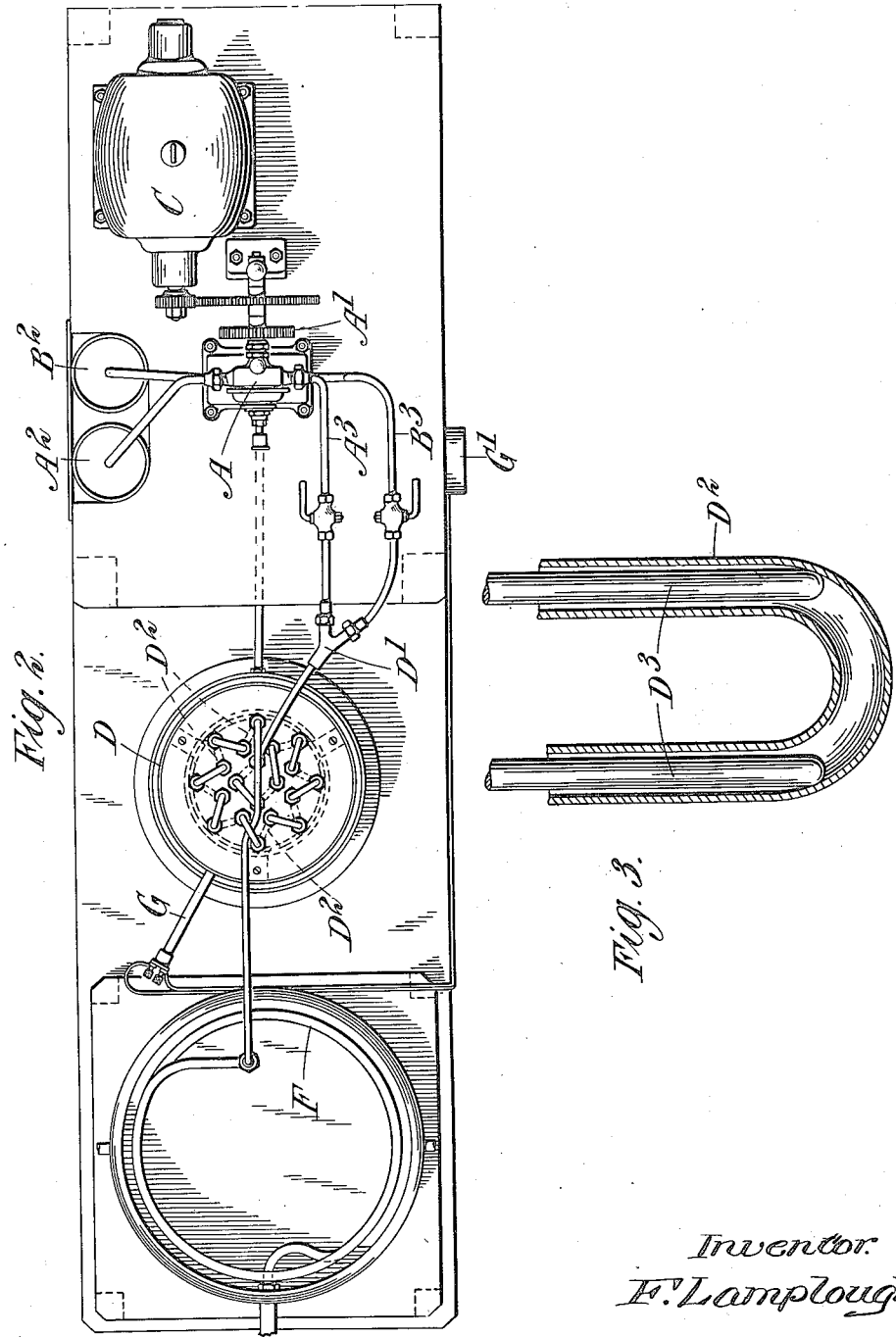

FREDERICK LAMPLOUGH, OF LONDON, ENGLAND.

PROCESS AND APPARATUS FOR THE CONVERSION OF HEAVY HYDROCARBONS INTO LIGHTER HYDROCARBONS.

1,229,098.     Specification of Letters Patent.     Patented June 5, 1917.

Application filed December 16, 1912. Serial No. 737,069.

*To all whom it may concern:*

Be it known that I, FREDERICK LAMPLOUGH, a subject of the King of England, residing at London, England, have invented certain new and useful Improvements in Processes and Apparatus for the Conversion of Heavy Hydrocarbons into Lighter Hydrocarbons, of which the following is a specification.

My invention consists in bringing heavy hydrocarbon oils, or other vapors, together with moisture or steam, into contact with each other in the presence of nickel in compact form, in a retort, said retort being maintained at a temperature of about a dull red heat, pressure being applied either derived from an external source or generated by the gas pressure of the process.

I have found that nickel has the valuable property of facilitating the conversion of fuel and lubricating oils or paraffins into lighter bodies of the paraffin series, *i. e.* those in which the proportion of hydrogen is somewhat increased. The lightest of the paraffins is methane $CH_4$, a gas, in which the carbon amounts to 75% of the whole. As the number of carbon atoms increases, or as the value of $n$ in the general formula $C_nH_{2n+2}$ increases, the percentage of carbon in the compound also increases. The lighter paraffins, that is the easily volatile or explodable ones, therefore have definitely larger percentages of hydrogen in the compound, and the ease with which they may be oxidized or burned increases as the percentage of hydrogen increases. Various attempts, more or less successful, have been made to bring about a union between the constituents, steam and various of the heavier hydrocarbons of the paraffin series.

These compounds are formed under heat and pressure when water and the vapors of these oils are brought together under heat and pressure.

It has been found that the reaction between the two gases, that is vapor of water and vapor of oil, is much augmented in the presence of various substances to which a catalytic action has often been ascribed under these circumstances. These substances are sometimes burned brick or clay, and sometimes various metals. Just what the effect of these substances on the vapors present is, has not yet been definitely ascertained, but for the sake of consistency and uniformity, in this specification, it will be regarded as catalytic.

One of the usual catalysts, as stated, is burned clay or aluminum silicate. The vapors of the two substances spread out and mingle through the whole porous mass of the burned brick, and are thus brought into intimate physical contact possibly by adhesion to the surface of the clay, and the desired reaction takes place thus. The baked clay material is slow, however, and is open to several objections, the principal one of which is that the clay is apt to become clogged by a deposition of tarry masses which can be removed with only the greatest difficulty.

Iron has been suggested and used, and iron also operates to effect the result desired, but there are several objections to iron also. One of these is that if the vapor of water should be in excess, or the temperature should be not just right, the iron will take the oxygen from the water molecules or will rust, and thus become useless. Not only is this objectionable, but the iron in rusting expands and has a tendency to burst any container in which it may be placed. Nickel has also been suggested in the shape of powder or fine particles. Nickel in this condition is, however, open to the same objection as clay inasmuch as it is apt to become charged with particles of tarry or carbonaceous matter which can be removed only with great difficulty. Moreover, the gases pass only very slowly through a mass of finely divided particles.

Nickel, though closely related to iron chemically, is not affected by steam and preserves its surface bright during all the conditions incident to the operation of my process, and is therefore effective.

I have discovered that if the nickel used in carrying out this process be arranged in compact extended form so as to afford channels or passages continuously of nickel through which the vapors may sweep with considerable velocity, the deposition of carbon is avoided and the surfaces of the nickel kept clean and bright, and always chemically active.

The nickel is arranged in solid form as distinguished from pulverized or comminuted form. That is, it is in lumps or nodules as distinguished from granules or powder. These lumps, which are solid, as I have stated, may have only a surface of nickel; that is, they may have a base of some other metal or substances nickel coated. It is obvious that the surface only has a catalytic effect. These masses or lumps of solid nickel should be so openly arranged that the current of gas and steam may sweep through them at considerable velocity. By this means the surfaces of the nickel are kept clean and bright, and any deposit of carbon is swept on through the mass of nickel and dropped elsewhere.

My invention therefore consists in, among other things, the use of nickel in compact masses, in relation to which openings are provided for the uninterrupted passage of the mixed gases, and the steady formation of the product desired uninterrupted by any depositions of carbon, practically indefinitely.

Preferably about 20 to 60 parts of water are used to 100 parts of oil, and the water and oil may be supplied through interconnected pumps for maintaining the requisite feed of the two materials in proper proportion to each other.

In the accompanying drawings:

Figure 1 shows in elevation and part section a plant suitable for carrying out the process.

Fig. 2 shows a plan of the same plant; and

Fig. 3 is a section of a detail.

Like letters indicate like parts throughout the drawings.

Superimposed pumps A and B are interconnected by gear wheels $A^1$, $B^1$ and receive motion from a motor C. The pump A draws crude oil from a tank $A^2$ and the pump B draws water from a tank $B^2$. The oil and water are delivered by conduits $A^3$, $B^3$, respectively, to a junction-piece $D^1$ which is connected with a tubular retort D. Below the retort is a burner E for heating it, which is supplied with crude oil from a pressure tank $E^1$. The oil is pumped from the tank by a plunger-pump $E^2$ operated by a variable throw device $E^3$ on the wheel $B^1$ of the pump B. A hand-pump $E^4$ is employed for putting pressure upon the tank $E^1$ to aid the pump $E^2$ in lifting the oil therefrom.

The retort D contains a number of tubes $D^2$ through which the oil and water flows, and these tubes contain nickel bodies which may be in the form of rods, or balls, or be otherwise shaped as found convenient.

In Fig. 3 the bottom portion of one of the tubes is shown in section, but on a scale larger than in Fig. 1, and nickel rods $D^3$ are shown within the same; these may be merely dropped in loose.

The oil and water leave the retort tubes in the form of permanent gas and vapors and pass thence to a cooling coil F where the vapors are condensed into water, oil and spirit which may be afterward separated and rectified.

It will be appreciated that the pumps A and B, if once set to operate at any ratio one to the other, will always feed the oil and water to the retort in the same proportions, even though the speed of the motor C may vary, and by means of the variable throw device $E^3$, the pump $E^2$ can be adjusted so that the burners will maintain the retort tubes $D^1$ at the requisite temperature. The temperature of these tubes may be ascertained by looking through an inspection opening, or by a pyrometer G connected electrically to an indicator $G^1$.

The conversion may be carried on under pressure, and such pressure may be considerable, as pressure tends to reduce the amount of any volatile spirit carried away by the permanent gases. The pressure may be regulated by obstructing the escape of gas from the coil F by any suitable means, such as a relief valve placed at any desired point in the circuit. The permanent gas may be used to supply heat for any of the operations.

If the process is carried out at the proper speed with proper proportions and temperature, all of which can be easily judged by a little practice, there will be very little hydrocarbon found to be unconverted after passing through the retort, but such as is unconverted can be re-treated.

As intimated, the effect of the metal which I employ appears to be that of a catalyst, but it may not be such, however, and I do not wish to be bound by any theory of catalytic action in the present relation.

The proportioning of the quantities of the material treated and the regulation of the temperature and pressure, are all agents which must be carefully looked after in carrying out my process.

What I claim is:

1. In apparatus for converting heavy hydrocarbon oils into lighter oils, the combination of a retort, tubes containing bodies of nickel in compact extended form with continuous channels therethrough in such retort, a pump for forcing a heavy hydrocarbon oil at speed through said retort, a pump for forcing water at speed through said retort, means for heating the retort and the water and oil sent therein, to a temperature indicated by a dull red heat, and means for subsequently condensing the hydrocarbon vapors produced by the catalytic effect of the nickel surfaces.

2. In apparatus for converting heavy hydrocarbon oils into lighter oils, the combination of a retort, bodies of nickel each in compact form and having passages therethrough in said retort, a pump for forcing a heavy hydrocarbon oil through said retort, a pump for forcing water through said retort, driving means for said pumps, means for automatically maintaining the delivery of one pump in constant proportion to the delivery of the other at all speeds, a liquid-fuel burner for heating the retort, a third pump for delivering liquid fuel to the burner, adjustable means for driving this pump from the same driving means whereby the other two pumps are driven so that the fuel pump may be regulated to deliver the requisite proportion of fuel to maintain the proper supply of heat for the delivery of the other two pumps, and a condenser in circuit with the retort.

3. The process of converting the heavier constituents of petroleum into lighter constituents, which consists in passing said heavier constituents in the state of vapor together with steam, under pressure and at a temperature indicated at a low red heat over and in contact with nickel in compact extended form.

4. A process for converting the heavier hydro-carbons of petroleum into lighter hydro-carbons, which consists in passing said heavier hydro-carbons in a state of vapor together with steam, under pressure, and at a temperature indicated by a low red heat, at speed, over and in contact with bodies composed of nickel in compact extended form.

5. The herein described process for converting heavy hydrocarbon oils into light oils which consists in maintaining in a retort at a red heat, bodies consisting of solid nickel, and passing such heavy oils and an aqueous substance through said retort whereby said oils and aqueous substance are brought into intimate contact with the heated bodies composed of nickel in solid extended form aforesaid and thereby converted into lighter oils.

6. A process of producing hydrocarbon liquids of relatively low boiling points from hydrocarbon liquids of higher boiling points, which comprises passing the vapors of such hydrocarbon of higher boiling points, together with steam under a pressure materially above atmospheric, into contact with a mass of relatively small pieces of metallic nickel maintained at a temperature approaching 600° C., and thereafter condensing the resulting vapors.

In testimony whereof I have signed my name to this specification in the presence of two subscribing witnesses.

FREDERICK LAMPLOUGH.

Witnesses:
O. J. WORTH,
TRACY LAY.